United States Patent
Cook

(10) Patent No.: US 6,885,449 B1
(45) Date of Patent: Apr. 26, 2005

(54) OPTICAL INSPECTION SYSTEM BASED ON SPATIAL FILTERING USING A REFRACTIVE-INDEX-GRATING

(75) Inventor: Gary Cook, Malvern (GB)

(73) Assignee: Qinetiq Limited, Farnborough (GB)

(*) Notice: Subject to any disclaimer, the term of this patent is extended or adjusted under 35 U.S.C. 154(b) by 275 days.

(21) Appl. No.: 10/049,067

(22) PCT Filed: Aug. 7, 2000

(86) PCT No.: PCT/GB00/03034

§ 371 (c)(1),
(2), (4) Date: Feb. 20, 2002

(87) PCT Pub. No.: WO01/13099

PCT Pub. Date: Feb. 22, 2001

(30) Foreign Application Priority Data

Aug. 11, 1999 (GB) .............................................. 9918820

(51) Int. Cl.$^7$ .......................... G01B 11/00; G01N 21/00
(52) U.S. Cl. ...................... 356/394; 356/458; 356/369; 356/237.1
(58) Field of Search .......................... 356/71, 458, 394, 356/364, 365, 369, 370, 609, 613, 636, 237.1, 239.1; 359/1, 17, 15, 22, 29, 561, 563, 7

(56) References Cited

U.S. PATENT DOCUMENTS

| | | | |
|---|---|---|---|
| 4,174,179 A | | 11/1979 | Tschudi et al. |
| 4,212,536 A | | 7/1980 | Bencze et al. |
| 4,958,892 A | * | 9/1990 | Jannson et al. ............... 359/15 |
| 5,282,067 A | * | 1/1994 | Liu ............................. 359/4 |
| 5,440,669 A | * | 8/1995 | Rakuljic et al. ............... 359/7 |
| 5,493,444 A | * | 2/1996 | Khoury et al. ............. 359/559 |
| 5,680,212 A | * | 10/1997 | Blouin et al. ............... 356/458 |

FOREIGN PATENT DOCUMENTS

| | | |
|---|---|---|
| EP | 0 422 468 A2 | 9/1990 |
| GB | 2165983 A | 4/1986 |
| WO | 93/03427 | 2/1993 |

* cited by examiner

*Primary Examiner*—Gregory J. Toatley, Jr.
*Assistant Examiner*—Roy M. Punnoose
(74) *Attorney, Agent, or Firm*—Nixon & Vanderhye P.C.

(57) ABSTRACT

An optical inspection system (10) for comparing surface structures of test and reference objects comprises a laser (12), a photorefractive crystal (24) and a detector (30). A refractive index grating corresponding to a diffraction pattern of a surface structure of the reference object is present within the photorefractive crystal (24) and acts as a spatial filter for light diffracted by surface structures of the test objects. If a surface structure of a test object matches that of the reference object, little or no light reaches the detector (30). If the surface structure of a text object differs from that of the reference object, light of greater power reaches the detector (30). The system (10) provides a simple pass/fail comparison test and light incident on the detector (30) requires no interpretation or other processing. The system (10) may be adapted to allow simple imaging of an edge of an object.

13 Claims, 4 Drawing Sheets

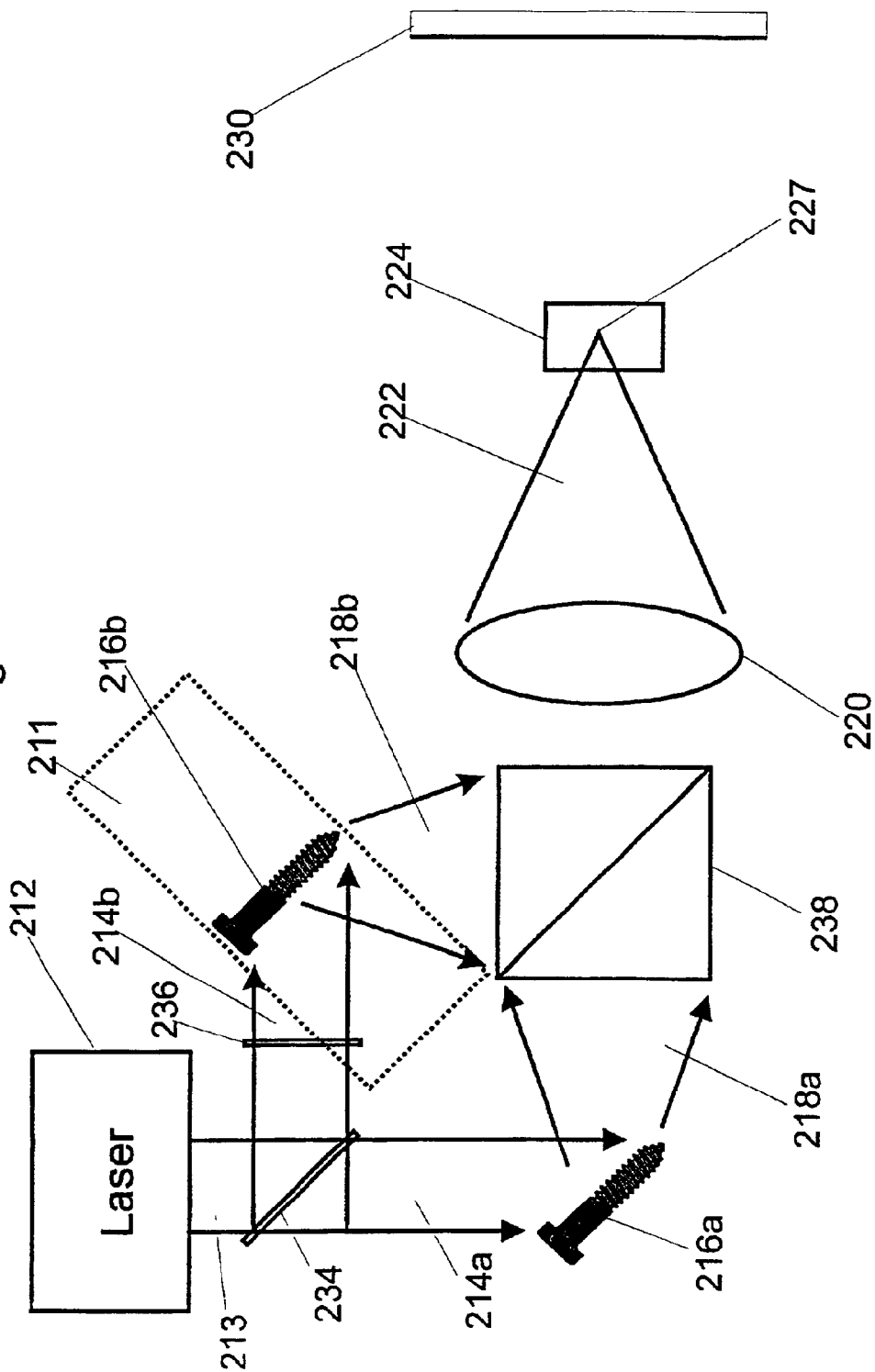

1

Figure 1:
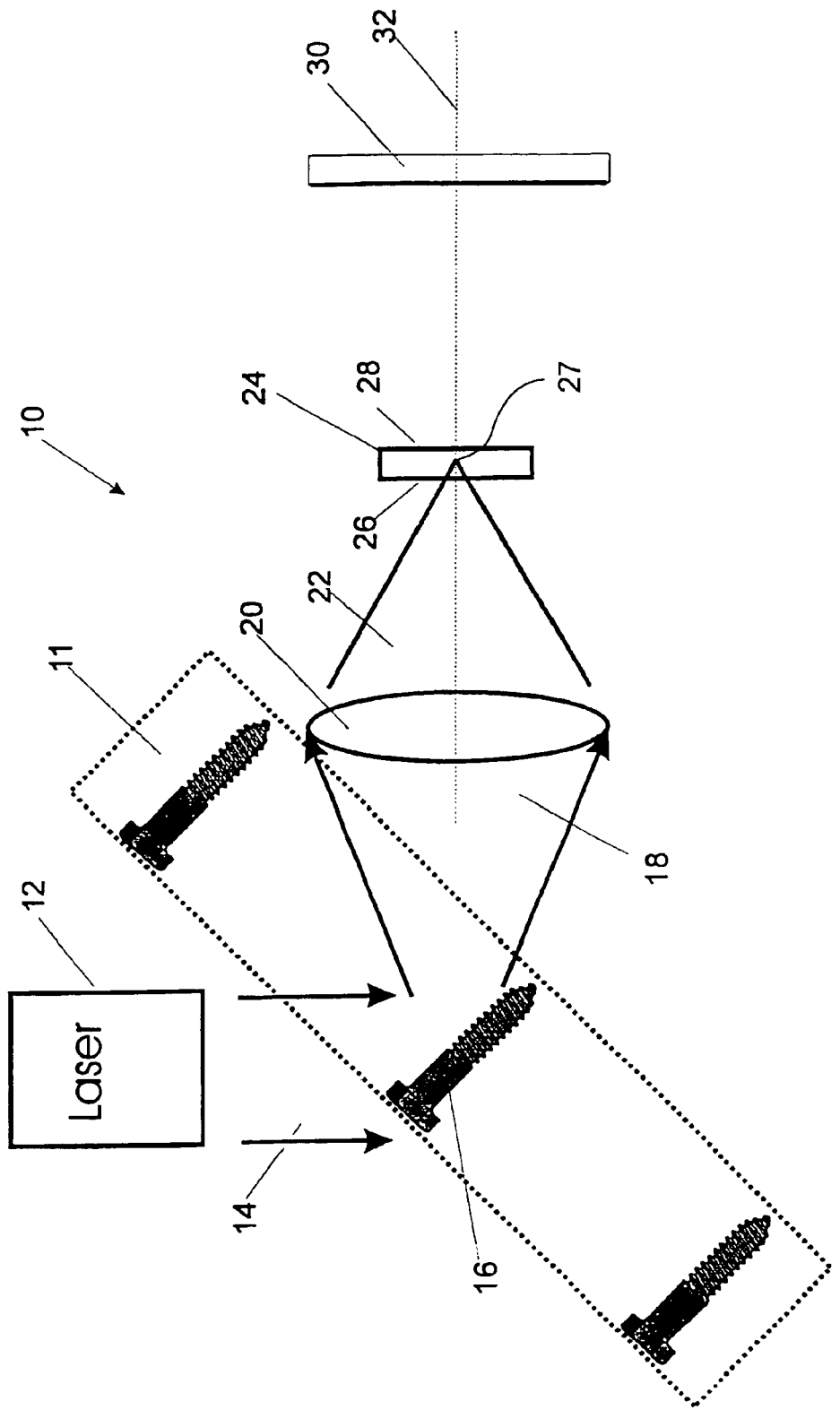

OPTICAL INSPECTION SYSTEM BASED ON SPATIAL FILTERING USING A REFRACTIVE-INDEX-GRATING

This application is the US national phase of international application PCT/GB00/03034 filed 7 Aug. 2000, which designated the US.

BACKGROUND OF THE INVENTION

1. Field of the Ivention

The invention relates to an optical inspection system.

2. Discussion of Prior Art

In a number of applications it is desirable to inspect an object to ensure that it has a required surface structure. For example, it is often necessary to inspect the surface structures of manufactured items on a production line to ensure that they meet a quality criterion. The surface structure of a test object may be inspected by comparing it to a reference object. having a required surface structure. Conventionally, such inspection may be performed using a camera interfaced with a computer to capture and compare images of the reference object and the test object.

This technique has the disadvantages that a computer is required, that considerable computer processing may be required If the surface structures of the objects concerned are complex and that considerable effort or expenditure is required to develop or purchase the software necessary to compare captured images. Another disadvantage of this technique is that there is a delay involved in obtaining the results of inspection. In a production process it is important to correct errors quickly in order to prevent a significant quantity of sub-standard products being output from the process. A further disadvantage of this technique is that it becomes increasingly difficult and time-consuming with increasing spatial frequency of features of objects to be inspected. For example, in the field of semiconductor integrated circuits, the everincreasing scale of integration is resulting in increasingly dense circuitry.

An alternative method for inspecting surface structure of objects involves optical diffraction. In this method, an optical detector interfaced with a computer is used to capture and compare respective diffraction patterns of the surface structures of a reference object and a test object. However this method also has the disadvantages described above. Afternatively, the respective diffraction patterns may be compared by use of a spatial filter. This involves making a spatial filter based on the diffraction pattern of the surface structure of the reference object and forming the diffraction pattern of the surface structure of the test object on the spatial filter. If the surface structure of the test object is identical to that of the reference object, no light passes through the spatial filter. However, this inspection method gives spurious results if the spatial filter is not accurately aligned. In addition, considerable effort has to be expended in producing bespoke spatial filters for different manufacturing processes.

Another prior art method which may be used to compare the surface structure of objects is holography. In this method, a hologram of the reference object is recorded on a photographic plate. The reference object is then replaced with the test object light passing through the photographic plate indicates that the test object has a different surface structure to that of the reference object, i.e. that the test object is defective. Again, spurious results are extremely difficult to avoid because the test object must be positioned exactly in the place of the reference object. A good quality test object displaced by a fraction of a wavelength may be rejected as defective because some light may pass through the photographic plate.

A further technique which may be used to compare reference and test objects is holographic correlation, which is described, for example, in U.S. Pat. Nos. 5,282,067 and 4,212,636. In this technique, a hologram is generated using preference object and diffracted light from a test object is passed through the hologram to produce an optical field which is used to generate a spatial cross-correlation function representing the degree to which the test and reference objects are alike. Systems for implementing holographic correlation are complex because they require means for generating holograms. Also, the spatial cross-correlation function requires interpretation in order to discern the degree to which test and reference objects are alike.

In another optical correlation technique, described in published UK patent application GB 2 165 983 A, light diffracted from reference and test objects is used to generate a grating structure within a nonlinear crystal. The grating structure is representative of the product of two Fourier transforms; one Fourier transform represents light diffracted from the reference object and the other represents light diffracted by the test object light diffracted from the grating is used to generate a spatial cross-correlation function representing the degree to which the test and reference objects are alike. Systems for implementing this technique are complex. Also, the spatial cross-correlation function requires interpretation in order to discern the degree to which test and reference objects are alike.

It is also desirable in certain circumstances to detect and image the edges of solid objects or refractive index discontinuities in transparent objects. For example, edge detection allows a test object to be examined for quality on the basis of its edge structure only, allowing objects with different surface features but the same required edge structure to be examined in a single process. It may also be required to examine the quality a series of transparent test objects in a production process.

Forming an image of the edge of a solid object only is also presently very difficult For example, a shadow formed by the edge of an object is not an image purely of the edge of the object Optical inspection of a transparent object having a refractive index discontinuity by comparing it to a reference object is also currently very difficult. Although Schlieren photography is a known technique for refractive index mapping, it relies on spatial filtering. Schlieren photography is described in "Optics" by E. Hecht (second edition, 1987, Addison-Wesley, ISBN 0-201-11611-1) pp 576 and 577. If this method were to be used to compare reference and test objects, a spatial filter would be required. This would present the alignment difficulties described above in relation to the inspection of objects using diffraction. Again, bespoke spatial filters would be required for different manufacturing processes.

SUMMARY OF THE INVENTION

It is an object of the invention to provide an altemative optical inspection system.

The present invention provides an optical inspection system for inspecting objects characterised in that It incorporates a light source for generating within a medium a refractive index grating for rejecting diffracted or undifracted light, the grating being generated either by diffraction of light from a reference. object or by light bypassing an object under inspection, and means for detecting light which is diffracted by an object under inspection and which passes through the medium.

Embodiments of the invention are inexpensive, readily adaptable to inspect different objects and are simple in that only a single light beam is required to generate the refractive index grating.

Embodiments of the invention may be used to compare a surface structure of a test object with that of a reference object, in which case the refractive index grating has a modulation in two dimensions corresponding to a diffraction pattern obtained from the reference object.

Embodiments of the invention may be used to form an image of an edge of an object or of a refractive discontinuity In a transparent object from light diffracted by the edge or discontinuity, without the need for spatial filtering specific to particular objects, i.e. the system is adaptable to imaging of edges or discontinuities of different objects without modification. Such embodiments comprise a refractive index grating with a spatial extent in two dimensions corresponding to that of light undiffracted by the edge or discontinuity and means for forming an image of the edge or discontinuity fromlight diffracted by the edge or discontinuity.

The system preferably includes a photorefractive crystal having a sufficient density of space charge traps to allow writing of an adequate refractive index grating in the crystal, i.e. a grating which has sufficient contrast to prevent leakage of light through the crystal when an object of the required quality is inspected. The photorefractive crystal is preferably of iron-doped lithium niobate because such crystals are easy to grow and therefore relatively cheap, and because gratings written in such crystals have a useful duration of at least several months. The iron doping level should be between 0.01 and 0.2 molar percent to provide the necessary density of space charge traps. The system preferably includes a laser with an output wavelength in the range 450 to 550 nm as this wavelength produces the most effective photorefractive Interaction in iron-doped lithium niobate. The output power of the laser should be of the order of a few millmtatts to enable adequate gratings to be written in the photorefractive crystal without using an unnecessarily high laser power.

BRIEF DESCRIPTION OF THE INVENTION

Figure 2:
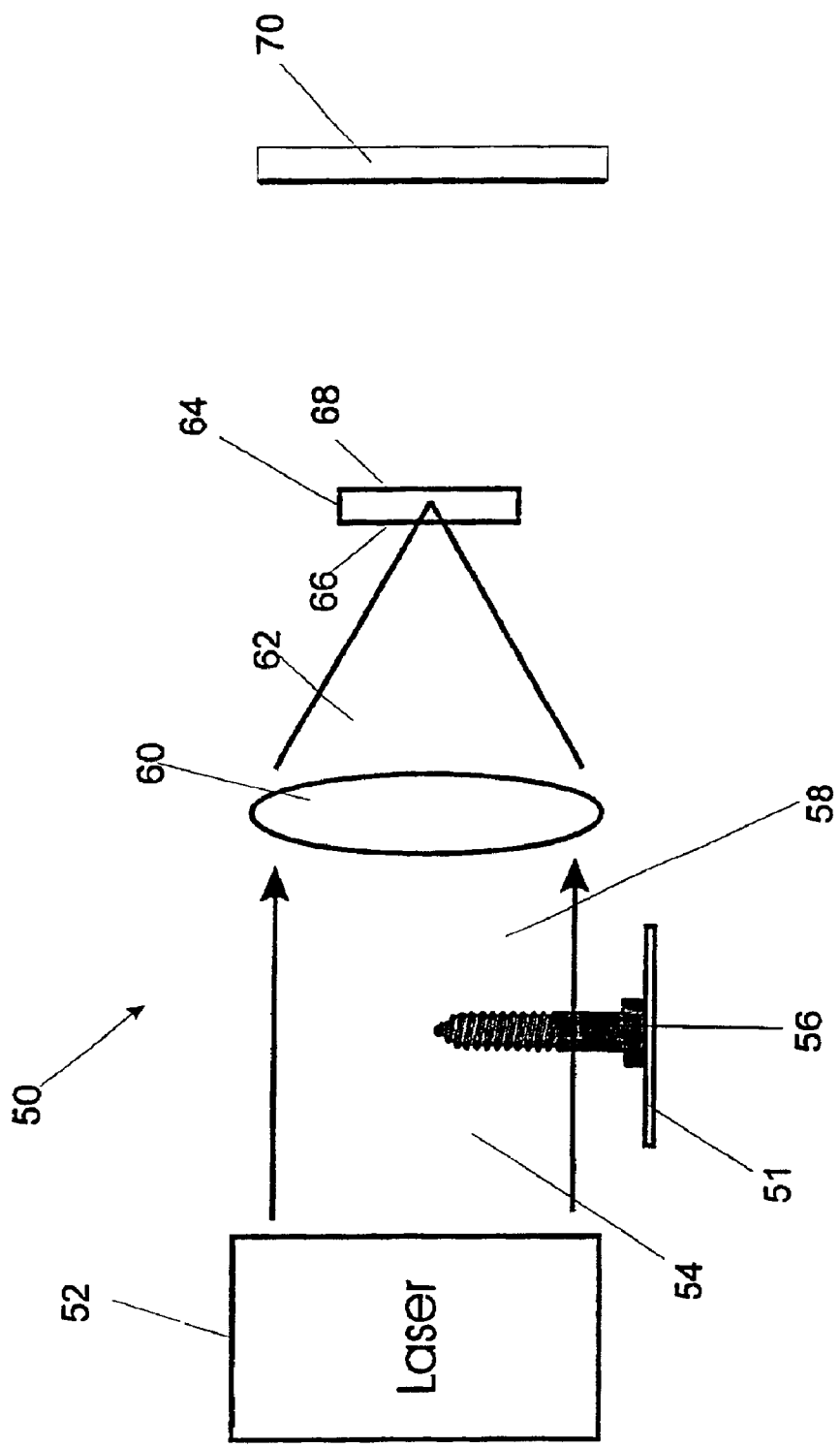
Figure 3:
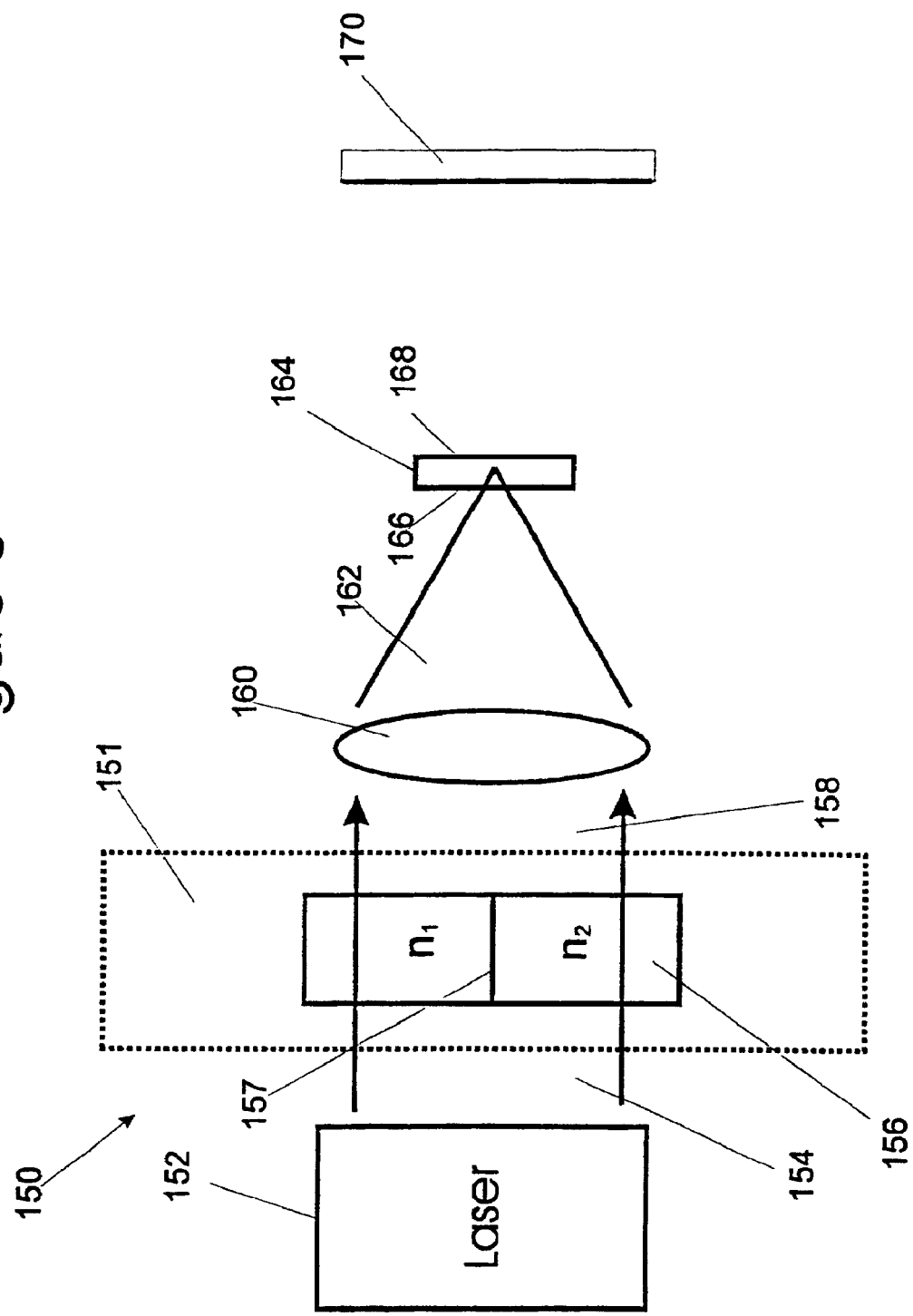

In order that the invention may be more-fully understood, embodiments thereof will now be described, by way of example only, with reference to the accompanying drawings in which FIG. 1 is a schematic of an inspection system of the invention for the optical inspection of the surface structures of objects, FIG. 2 is a schematic of an inspection system of the invention for the detection and imaging of the edges of objects, FIG. 3 is a schematic of an inspection system of the invention for the detection and imaging of refractive index discontinuities in transparent objects, and FIG. 4 is a schematic of another inspection system of the invention for the optical inspection of the surface structures of objects.

DETAILED DISCUSSION OF EMBODIMENTS

Referring now to FIG. 1, there is shown a plan view of an inspection system of the invention, indicated generally by 10, for optical inspection of surface structures of objects. The apparatus 10 comprises a conveyor belt 11, a frequency-doubled continuous-wave neodymium yttrium aluminium garnet (Nd:YAG) laser 12 having an output power of the order of a few milliwatts and an output wavelength of 532 nm, a reference or test object 16, a lens 20, a photorefractive crystal 24 and a detector 30. The laser 12 incorporates optical components (not shown) for expanding its output beam to produce a collimated beam 14 of sufficient width to illuminate the test or reference object 16. The lens 20 is a standard glass lens of focal length fand is placed at a distance x from the reference or test object 16 where x>f. The photorefractive crystal 24 is placed at a distance of at least f from the lens 20 at a point where light diffracted from the reference or test object 16 is focussed. It is a single crystal of iron-doped lithium niobate, Fe: $LiNbO_3$, having front and back faces 26, 28 which are plane, parallel and polished to an optical finish. It has an iron doping level of 0.1 molar percent and a width of 4 mm. The cut of the photorefractive crystal 24 is such that Its crystallographic c axis (not shown) is perpendicular to the crystal faces 26, 28. A detector 30 is placed behind the photorefractive crystal 24. The components 16, 20, 24 and 30 of the system 10 are aligned along a common axis 32. Operation of the inspection system 10 will now be described. With the conveyor belt 11 stationary, a reference object 16 having the surface structure required of the test objects is placed in the laser beam 14. Diffracted light 18 emanating from the reference object 16 passes through lens 20 to form a beam of signal light 22 which is focused into photorefractive crystal 24. Photorefractive interaction between the focused signal light 22 and light reflected from the rear surface 28 of the crystal 24 results in the formation of a refractive index grating within the crystal. The refractive index variations in the plane parallel to the front and rear surfaces 26, 28 depend on the diffraction pattern of the reference object 16. The refractive index grating is therefore characteristic of the surface structure of the reference object. The crystal 24 is exposed until a permanent grating is formed in it and all the focused signal light 22 is reflected back towards the lens 20, i.e. no light reaches the detector 30. The exposure time depends on the laser wavelength and intensity and the iron doping level of the lithium niobate crystal. The grating formed In the crystal 24 persists for between one month and one year, depending on the particular crystal used. Orientation of the photorefractive crystal 24 during writing of the grating is not critical. The crystallographic c axis (not shown) of the crystal 24 may deviate from the axis 32 of the system 10 by several degrees.

The reference object is then removed, and the conveyor belt 11 serially conveys a series of test objects through the collimated laser beam 14. Diffracted light 18 emanating from a test object is focused into the crystal 24. If the diffraction pattern formed in the crystal 24 matches that of the reference object, all the incident signal light 22 is reflected by the refractive index grating towards the lens 20 and no light passes to the detector 30. However if the surface structure of a test object differs from that of the reference object, a fraction of the incident signal light 22 passes through the photorefractive crystal 24 and reaches the detector 30, indicating that the test object has a defective surface structure. The refractive index grating thus acts as a spatial filter for light diffracted from a test object.

The orientation of the test object must be the same as that of the reference object if it is required that no light should pass through the crystal 24 when a test object matching the reference object is inspected. However by displacing the crystal 24 a small distance from the focus of the signal light 22 along the axis 32 the requirement that the orientations of the reference and test objects be the same is relaxed with this modified arrangement, inspection of a test object with a surface structure matching that of the reference object results in detection of low intensity right at the detector 30 rather than no light at all. As the crystal 24 is displaced further from the focus 27 of the signal light 22, intensity contrast between optical signals reaching the detector 30 corresponding to a test object passing and failing a comparison test with the reference object is reduced, but tolerance of the system 10 to mis-orientation of the test object is increased.

A grating formed in the photorefractive crystal 24 may be erased by heating the crystal 24 to 25° C. and then cooling It to room temperature, allowing it to be reused for inspection of different objects. The system 10 may therefore be adapted to inspect different objects. Alternatively, multiple gratings may be written into the crystal 24 at different positions.

Referring now to FIG. 2, there is shown another inspection system of the invention, indicated generally by 50, which allows an image of the edge of a solid object to be obtained. The system 50 comprises elements 51 to 70 equivalent to elements 11 to 30 respectively of the system 10.

Operation of the system 50 will now be described. A conveyor belt 51, moving perpendicularly to the plane of the paper in FIG. 2, serially conveys a series of test objects such as 56 through a laser beam 54. The edges of the objects to be imaged are located approximately within the centre of the laser beam 54. As a test object 56 passes through the laser beam 54, light 58 passes through a lens 60 to produce signal light 62 which is focused into a photorefractive crystal 64. The light 58 consists of a component diffracted by the edges of the object 56 and also a component from the beam 54 which is not diffracted. The signal light 62 has diffracted and non-diffracted A components and the former is of low intensity relative to the latter. The diffracted component is located at the periphery of the focused signal light 62. The non-diffracted component of the focused signal light 62 experiences photorefractive interaction with corresponding light reflected from a rear surface 68 of the photorefractive crystal 64 resulting in the formation of a refractive index grating. It is reflected by the grating towards the lens 60 whilst the peripheral, low-intensity diffracted component experiences no photorefractive Interaction and passes through the photorefractive crystal 64. An image of the edge of the object 56 is formed on the detector 70.

Referring now to FIG. 3, yet another inspection system of the invention is shown which enables refractive index discontinuities within transparent objects to be detected and imaged. The inspection system is indicated generally by 150. Elements equivalent to those described earlier are like referenced with a prefix 100. The elements 151 to 170 of the apparatus 150 are equivalent to elements 51 to 70 except that an object to be inspected, such as 156, is now a transparent object having regions of differing refractive index $n_1$ and $n_2$ which form a refractive index discontinuity 157. A conveyor belt 151 serially conveys a series of test objects such as 156 through a laser beam 154. The laser beam 154 from the laser 152 illuminates the refractive index discontinuity 157 of the transparent object 156. Light 158 comprising both light diffracted by the refractive index discontinuity 157 and undiffracted light, passes through the lens 160 producing signal light 162 which is focused into the photorefractive crystal 164. Photorefractive interaction reflects the undiffracted component of the signal light 162 and passes the diffracted component by the process described above. An image of the refractive index discontinuity 157 is formed on the detector 170.

Referring now to FIG. 4, there is shown another inspection system of the Invention, indicated generally by 200. The system 200 includes elements 211 to 230 equivalent to elements 11 to 30 of the system 10. In addition it includes a beam-splitter 234, a half-wave plate 236 and a polarising beam-splitter/recombiner 238.

The system 200 operates as follows. Linearly polarised light 213 emitted by the laser 212 is divided by the beam-splitter 234 into two components 214a, 214b. On passing through the half-wave plate 236, the component 214b becomes polarised orthogonal to the polarisation of the component 214a. The component 214b illuminates a series of test objects such as 216b which are passed serially through it on a conveyor belt 211. The component 214a illuminates a reference object 216a having a surface structure required of the test objects. Light signals 218a, 218b diffracted from the surfaces of the reference object 216a and a test object 216b respectively are combined by polarisation multiplexing in the polarising beam-splitterlrecombiner 238 and focused by a lens 220 to form focused signal light 222 which is brought to a focus 227 within a crystal of irondoped lithium niobate 224. The beam-splitter 234 divides the light 213 output by the laser 212 such that the component 214a has a greater intensity than the component 214b. Light 218a diffracted by the surface of the reference object 216a has sufficient intensity to form a real-time refractive index grating in the crystal 224,i.e. a grating which is generated at the same time as the test object is inspected. Light 218b diffracted by the test object 216b has insufficient intensity to from such a grating. When a test object having a surface structure matching that of the reference object 216a passes through the component 214b of the light 213, no light reaches the detector 230. If a surface structure of a test object is not the same as that of the reference object 216a a fraction of the focused signal light 222 passes through the crystal 224 and reaches the detector 230.

What is claimed is:

1. Apparatus for comparing the surface structure of a test object with that of a reference object, the apparatus comprising:

a source of laser light;

means for focusing said laser light at least on said test object, for diffraction of said laser light by said test object, so as to produce a diffracted beam having an optical field conveying a diffraction pattern of the test object;

a photorefractive crystal arranged to receive the diffracted beam, wherein the photorefractive crystal is arranged such that a portion of the diffracted laser light is interfered with itself by counterpropagation of laser light within the crystal so as to produce a refractive index grating, said grating having a modulation depth which is a function of position in two mutually orthogonal directions, said function corresponding to the diffraction pattern of the reference object within the crystal; and a detector of laser light passing through said crystal.

2. Apparatus according to claim 1 wherein the intensity of the laser's output light is sufficiently intense for the grating to be permanently written into the crystal.

3. Apparatus according to claim 1 wherein the photorefractive crystal is a crystal of iron-doped lithium niobate.

4. A method of comparing the surface structure of a test object with that of a reference object, the method comprising the steps of:

(i) diffracting laser light from the surface of the reference object to produce a diffracted beam;

(ii) interfering a portion of said beam with itself by counterpropagation of said laser light within a photorefractive crystal, so as to produce a refractive index grating within said crystal, said grating having a modulation depth which is a function of position in two mutually orthogonal dimensions, said function corresponding to the diffraction pattern of the reference object within the crystal;

(iii) diffracting laser light from the test object;

(iv) passing light diffracted by the test object through said grating substantially in a direction co-parallel with the direction of said counterpropagation; and (v) detecting any light which is diffracted by the test object and which passes through said grating.

5. The method of claim 4 wherein, in step (ii), said grating is permanently written into said crystal.

6. An apparatus for comparing a test object with a reference object, said apparatus comprising:

a laser source of substantially collimated light for illuminating at least said test object;

a photorefractive crystal having a refractive index grating characteristic of said reference object;

a lens system for focusing light diffracted from said illuminated test object on said crystal; and a detector of any laser light passing through said photorefractive crystal and indicating a difference between said test object and said reference object.

7. The apparatus according to claim 6, wherein said comparison is the surface structure of the test object with the surface structure of the reference.

8. The apparatus according to claim 7, wherein the surface structure is an outline of the test object.

9. The apparatus according to claim 7, wherein said test object and said reference object are transparent and the comparison is a junction between the test object and the reference object.

10. An apparatus for comparing surface structure of a test object with the surface structure of a reference object, said apparatus comprising:

a laser source of substantially collimated light for illuminating at least said test object;

a photorefractive crystal having a refractive index grating characteristic of said reference object;

a lens system for focusing light diffracted from said illuminated test object on said crystal; and a detector of any laser light passing through said photorefractive crystal and indicating a difference between the surface structure of said test object and said reference object.

11. An apparatus for providing an image of the outline of a test object, said apparatus comprising:

a laser source of substantially collimated light, said test object occluding at least some of said collimated light and providing edge diffracted light;

a photorefractive crystal having a refractive index grating;

a lens system for focusing said collimated light and said edge diffracted light from said test object on said crystal; and a detector of any laser light passing through said photorefractive crystal indicating an outline of said test object.

12. An apparatus for providing an image of a refractive index discontinuity in a transparent test object, said apparatus comprising:

a laser source of substantially collimated light, said test object discontinuity illuminated by at least some of said collimated light and providing discontinuity diffracted light;

a photorefractive crystal having a refractive index grating;

a lens system for focusing said collimated light and said discontinuity diffracted light from said test object on said crystal; and a detector of any laser light passing through said photorefractive crystal indicating said discontinuity of said test object.

13. An apparatus for comparing surface structure of a test object with the surface structure of a reference object, said apparatus comprising:

a laser source of substantially collimated and polarized light;

a beamsplitter for splitting said collimated light into a reference object beam and a test object beam, said reference object beams having a greater intensity than said test object beam;

a half-wave plate for orthogonally polarizing one of said beams relative to the other of said beams, said reference object illuminated by said reference beam and said test object illuminated by said test object beam;

a polarizing beam-splitterlrecombiner for combining diffracted images from said test and reference objects;

a photorefractive crystal;

a lens system for focusing said combined light reflected from said illuminated test object and said reference object on said crystal; and a detector of any laser light passing through said photorefractive crystal and indicating a difference between the surface structure of said test object and said reference object.

* * * * *